Nov. 4, 1969 E. L. BONIN 3,476,941

PHOTOTRANSISTOR HAVING LIGHT SENSITIVE DIODE CONNECTED ACROSS COLLECTOR-BASE JUNCTION TO INCREASE TURNOFF TIME

Filed Sept. 27, 1967 3 Sheets-Sheet 1

EDWARD L. BONIN
INVENTOR

BY James C. Fails
ATTORNEY

United States Patent Office 3,476,941

Patented Nov. 4, 1969

3,476,941

PHOTOTRANSISTOR HAVING LIGHT SENSITIVE DIODE CONNECTED ACROSS COLLECTOR-BASE JUNCTION TO INCREASE TURNOFF TIME

Edward L. Bonin, Richardson, Tex., assignor to Texas Instruments Incorporated, Dallas, Tex., a corporation of Delaware Filed Sept. 27, 1967, Ser. No. 670,967
Int. Cl. H01j *39/12*
U.S. Cl. 250—211 22 Claims

ABSTRACT OF THE DISCLOSURE

This specification discloses a method of rapidly turning off a conducting transistor characterized by intermittently supplying power to a photon emitter-to-excite and turn on a semiconductor device that, in turn, effects flow of electrons through a properly coupled circuit and through the base of the transistor in a direction opposite to normal flow when the transistor is on. Any means may be employed to turn on the transistor. For example, a second photon emitter may be employed to turn on the transistor, either directly or through excitation of a second semiconductor device connected to effect a flow of electrons through the base of the transistor in the same direction as normal flow when the transistor is on. In this way a single circuit can be employed with couplet photon emitters to excite, respectively, the transistor and the semiconductor device; or, alternatively, appropriately connected semiconductor devices; rapidly turning on and off the transistor in response to a simple control and power signal, such as a square wave alternating current.

BACKGROUND OF THE INVENTION

*Field of the invention.*—This invention pertains to circuits employing a transistor switch. More particularly, it pertains to rapidly switching circuits in which fast turn off of the transistor is advantageously employed.

*Description of the prior art.*—Transistors have been employed widely in electronic circuits. Use of transistors as switching devices, however, has been limited by the relatively long time it takes for a transistor to turn off. For example, the low impedance units such as M7, have turn off times (half-widths of the transient) of over 100 microseconds.Thus there is very little art on the use of transistors as switches when fast turn off of the switch is required.

SUMMARY OF THE INVENTION

In accordance with the invention, there is provided a method of rapidly turning off a conducting transistor by employing a turn off drive. The method comprises (a) connecting the base of the transistor via a photon responsive semiconductor device in a circuit effecting flow of electrons through the base in a direction opposite to normal flow when the semiconductor device is excited and rendered conductive, (b) "optically coupling," as defined hereinafter, a photon emitter to the semiconductor device, (c) activating the photon emitter to excite and render conductive the semiconductor device; which, in turn, effects a reverse flow of electrons through the base discharging the base capacitance and turning off the transistor.

A system enabling performing the method of the invention is also provided.

DESCRIPTION OF SPECIFIC EMBODIMENTS

A brief description of prior art circuits is given before a description of the invention. This is believed helpful in illustrating the advantage of the invention.

Figure 1:
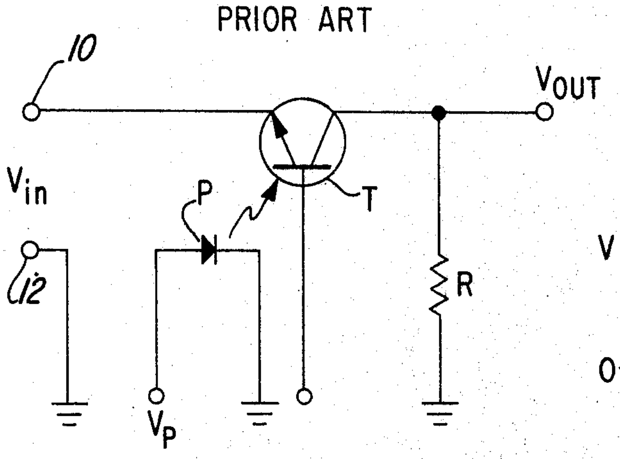
FIGURE 1 is a schematic drawing of prior art optoelectronic switches employing transistors.

A typical circuit of the prior art employing a transistor, as a switch, in series with a load is shown in FIGURE 1. Therein, a load R is coupled in series with transistor T between contact 10 and ground. A voltage $V_{in}$ is impressed across contacts 10 and 12. Before transistor T is turned on, a system voltage $V_{out}$, as measured at a contact 13 is illustrated at point 14 on the $V_{out}$ curve in FIGURE 2. To excite transistor T and render it conducting by optical methods a photon emitter P is optically coupled to transistor T and activated by supplying power with a voltage $V_P$ thereacross.

By being "optically coupled to transistor T" is meant being positioned such that photons emitted from photon emitter P will impinge upon and excite transistor T. Ordinarily, photon emitter P is placed adjacent transistor T, or in close proximity thereto, where only a gap of air separates the two. The photon emitter may be separated from the transistor by a photon transparent material such as a glass lens or tube.

Figure 2:
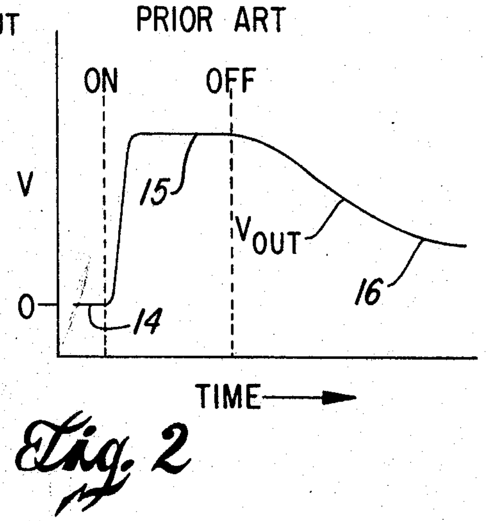
FIGURE 2 is a plot of a reference voltage indicating turn on and turn off times of such prior art optoelectronic switches.

When the transistor is turned on, the voltage $V_{out}$ increases rapidly to its steady state value shown at point 15 in FIGURE 2.

To turn off transistor T, photon emitter P is deactivated by removing voltage $V_P$. Appropriate switching means for applying and removing voltages; e.g. multivibrators, or the alternating voltages referred to hereinafter; are well known and are not shown herein in the interests of simplification. When used alone in a circuit, however, such switching means do not provide the electrical isolation effected by applicant's invention. The removal of voltage and deactivation of photon emitter P is shown in FIGURE 2 at the point marked "off." Although transistor T is no longer excited by photons and is ostensibly in an off condition.

it takes a long time to turn off, as indicated by decrease of voltage $V_{out}$, illustrated at point 16 in FIGURE 2.

Simple switching embodiment

Figure 3:
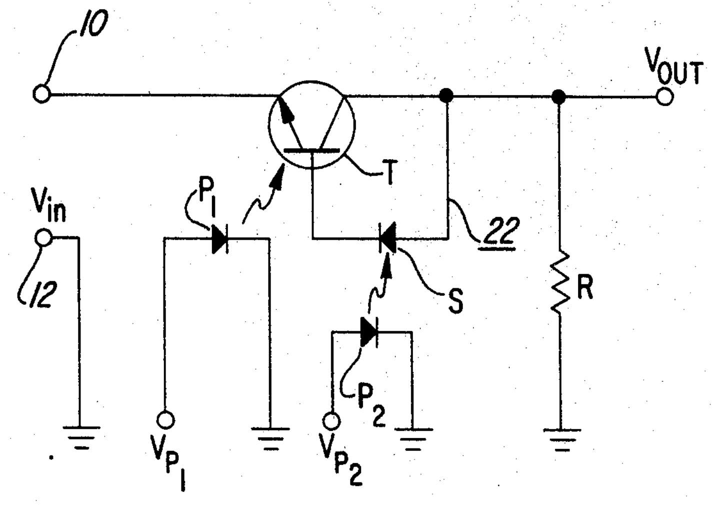
FIGURE 3 is a schematic drawing of one embodiment of the invention.
Figure 4:
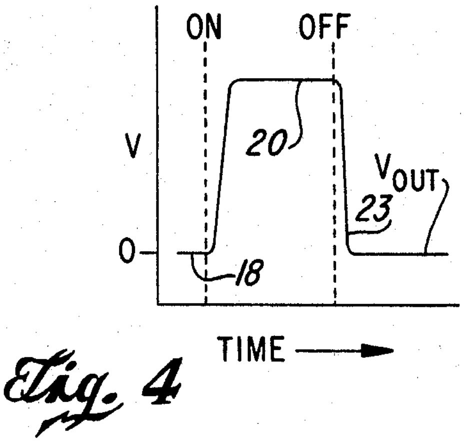
FIGURE 4 is a plot of a reference voltage indicating turn on and turn off times of such an embodiment of the invention.

The employment of the invention to turn off transistor T more rapidly; i.e., to increase the speed with which $V_{out}$ returns to zero; is described with reference to FIGURES 3 and 4. FIGURE 3 schematically illustrates a circuit in which the collector-base junction of transistor T is reverse biased to rapidly turn off the transistor. Therein transistor T is coupled in series with load R between contact 10 and ground. Similarly as described in connection with FIGURE 1, a voltage $V_{in}$ is impressed across contacts 10 and 12. Before the transistor T is rendered conductive, the voltage $V_{out}$ is illustrated in FIGURE 4 at point 18. Photon emitter $P_1$ is optically coupled to transistor T. To turn on transistor T, voltage $V_{P_1}$ is impressed across photon emitter $P_1$, activating it; consequently irradiating, exciting and rendering conductive transistor T. At this time $V_{out}$ increases rapidly to its steady state voltage shown in FIGURE 4 as 20.

In order to expedite turn off of transistor T, a semiconductor device S is coupled to the base of transistor T to effect flow of electrons through the base of transistor T in a direction opposite to normal flow when transistor T is on. Specifically circuit 22 connects the collector and the base of transistor T to, respectively, the anode and cathode of semiconductor device S, if the transistor is an NPN-type transistor. Connections are reversed if it is a PNP-type transistor.

The semiconductor devices employed herein are photosensitive and, consequently, when irradiated by photons, they become excited, become conductive and cause electrons to flow from their cathodes to their anodes through available circuits. The sequence of being irradiated, consequently becoming excited, becoming conductive, and causing electrons to flow through an available circuit will be referred to herein as "being optically turned on."

To optically turn on semiconductor device S, a second photon emitter $P_2$ is optically coupled thereto and is activated by application of a suitable power source $V_{P_2}$ thereacross.

When transistor T is to be turned off, voltage $V_{P_1}$ is removed from across photon emitter $P_1$, and simultaneously $V_{P_2}$ is applied across photon emitter $P_2$. Photon emitter $P_2$ optically turns on semiconductor device S. Semiconductor device S, in turn, provides a reverse bias across the collector-base junction and discharges the capacitance thereacross. This effects rapid turn off of transistor T, as indicated by the rapid return to zero of the voltage $V_{out}$, shown as 23 in FIGURE 4. Photon emitter $P_2$ is then deactivated and a cycle is completed.

Ordinarily, multiple cycles are employed whether with respect to this embodiment or others described herein.

Whereas in FIGURE 3 and the foregoing discussion the fast turn off of transistor T was effected by reverse biasing the collector-base junction, similarly rapid turn off of transistor T may be effected by reverse biasing the emitter-base junction. Such reverse biasing of the emitter-base junction is effected by coupling the base of transistor T via semiconductor device $S_2$ to the emitter of transistor T. Again, the circuit containing semiconductor device S effects a flow of electrons in the base of the transistor in a direction opposite to that in normal flow when transistor T is conducting. Specifically, for an NPN transistor the cathode of the semiconductor device is connected to the base of the transistor, and the anode is connected to the emitter.

Double emitter transistors

Figure 5:
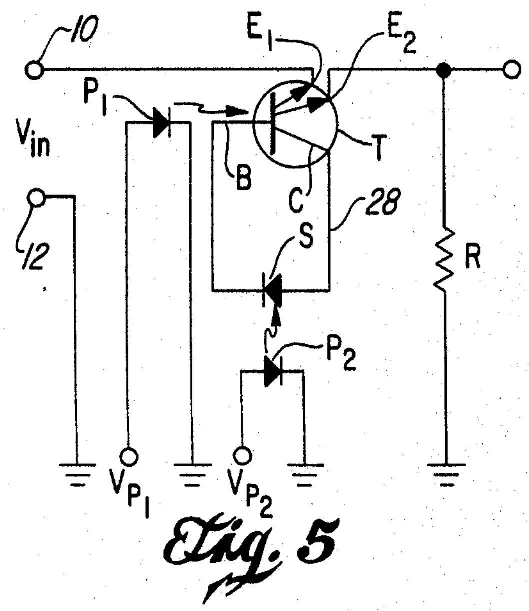
FIGURE 5 is a schematic drawing of another embodiment of the invention employing a double emitter transistor.

A double emitter transistor provides a particularly satisfactory switch when employed with the invention. FIGURE 5 illustrates schematically a circuit employing as the optoelectronic switch a double emitter transistor. Therein, transistor T is coupled in series, via emitters $E_1$ and $E_2$ connections, with load R between contact 10 and ground. A voltage $V_{in}$ is applied across contacts 10 and 12. Photon emitter $P_1$ is optically coupled to transistor T. To turn on transistor T, voltage $V_{P_1}$ is impressed across photon emitter $P_1$, which optically turns on transistor T.

The base B of transistor T is coupled via circuit 28 and semiconductor device S to the collector C of transistor T. Photon emitter $P_2$ is optically coupled to semiconductor device S. When transistor T is to be turned off, photon emitter $P_1$ is deactivated by removal of voltage $V_{P_1}$ and photon emitter $P_2$ is activated by impressing $V_{P_2}$ thereacross. Transistor T is no longer optically turned on, whereas semiconductor device S is. Thus, the collector-base junction of transistor T is provided with a reverse bias and transistor T is rapidly turned off. Photon emitter $P_2$ may be deactivated at this time by removal of voltage $V_{P_2}$ since a cycle has been completed.

Use in commutator

One of the most promising applications for an optoelectronic switch is in an analog commutator array. Employing optoelectronic switching enables effecting a high degree of electrical isolation of the switching element through the use of optical coupling.

In practice, it has been found preferable to employ, in a commutator array, additional semiconductor devices which can be optically turned on and serve as a turn on drive for a transistor. In operation, these additional semiconductor devices are coupled so that when they are optically turned on, they cause electrons to flow through the base of the transistor in the same direction as normal flow. Thus, as described above in connection with FIGURE 3, the additional semiconductor devices can be connected, by observing proper polarity, across the collector-base junction and provide a forward bias of the collector-base junction. Conversely and alternatively, the additional semiconductor devices, again through observing the proper polarity, can be connected across the emitter-base junction to provide a forward bias of the emitter-base junction to turn on the transistor. In either of these connections the additional semiconductor devices will provide a rapid turn on of the transistor.

Figure 6:
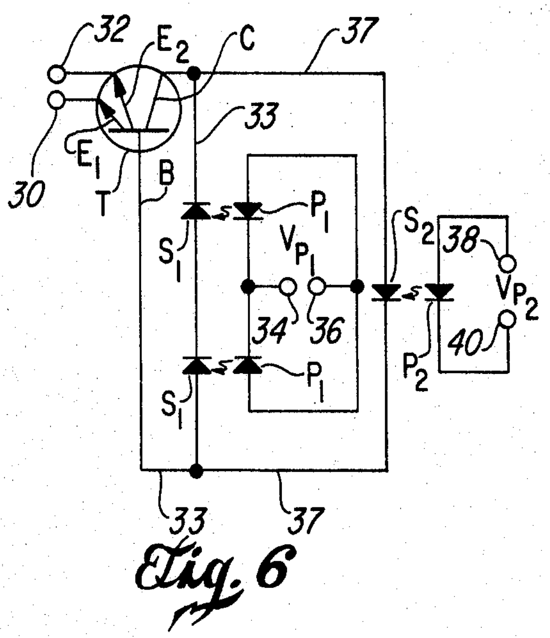
FIGURE 6 is a schematic drawing of a single stage embodiment of the invention employing semiconductor devices both to turn on and to turn off the transistor.

One such circuit which has been found practical is illustrated in FIGURE 6. The circuit which is schematically illustrated in FIGURE 6 has been advantageously employed as a single stage in a commutator array. In FIGURE 6 a circuit in which a fast acting transistor switch is advantageously employed is connected to contacts 30 and 32 which are in turn connected to the emitters $E_1$ and $E_2$ of transistor T. The base B of transistor T is connected to the collector C thereof through circuit 33 via two semiconductor devices $S_1$ connected in series. The polarity of the semiconductor devices $S_1$ is such that, when they are optically turned on, they provide a forward bias across the collector-base junction, turning on transistor T.

To optically turn on semiconductor devices $S_1$, photon emitters $P_1$ are optically coupled thereto. As illustrated in FIGURE 6 photon emitters $P_1$ are connected in parallel such that when voltage $V_{P_1}$ is applied across contacts 34 and 36 they are activated and optically turn on semiconductor devices $S_1$.

Also, the base B is connected to the collector C through a circuit 37 via semiconductor device $S_2$. The polarity of semiconductor device $S_2$ connections are reversed from those of semiconductor devices $S_1$ such that when semiconductor device $S_2$ is optically turned on, a reverse bias is provided across the collector-base junction of transistor T. To optically turn on semiconductor device $S_2$, a photon emitter $P_2$ is optically coupled to semiconductor device $S_2$ and connected to contacts 38 and 40. Upon application of voltage $V_{P_2}$ thereacross, photon emitter $P_2$ is activated, optically turning on semiconductor device $S_2$.

Thus by application of voltage $V_{P_1}$ across contacts 34 and 36 dual photon emitters $P_1$ are activated, optically turning on dual semiconductor devices $S_1$ to turn on transistor T. This switches on the circuit (not shown) connected to contacts 30 and 32. By employing dual semiconductor devices $S_1$, ample current is provided to give a sure, fast turn on of transistor T.

To turn off transistor T, voltage $V_{P_1}$ is removed from across contacts 34 and 36, removing the photon excitation of semiconductor devices $S_1$. Simultaneously voltage $V_{P_2}$ is applied across contacts 38 and 40, activating photon emitter $P_2$, optically turning on semiconductor device $S_2$, providing a reverse bias across the collector-base junction of and rapidly turning off transistor T. Voltage $V_{P_2}$ can then be removed since a cycle has been completed.

Figure 7:
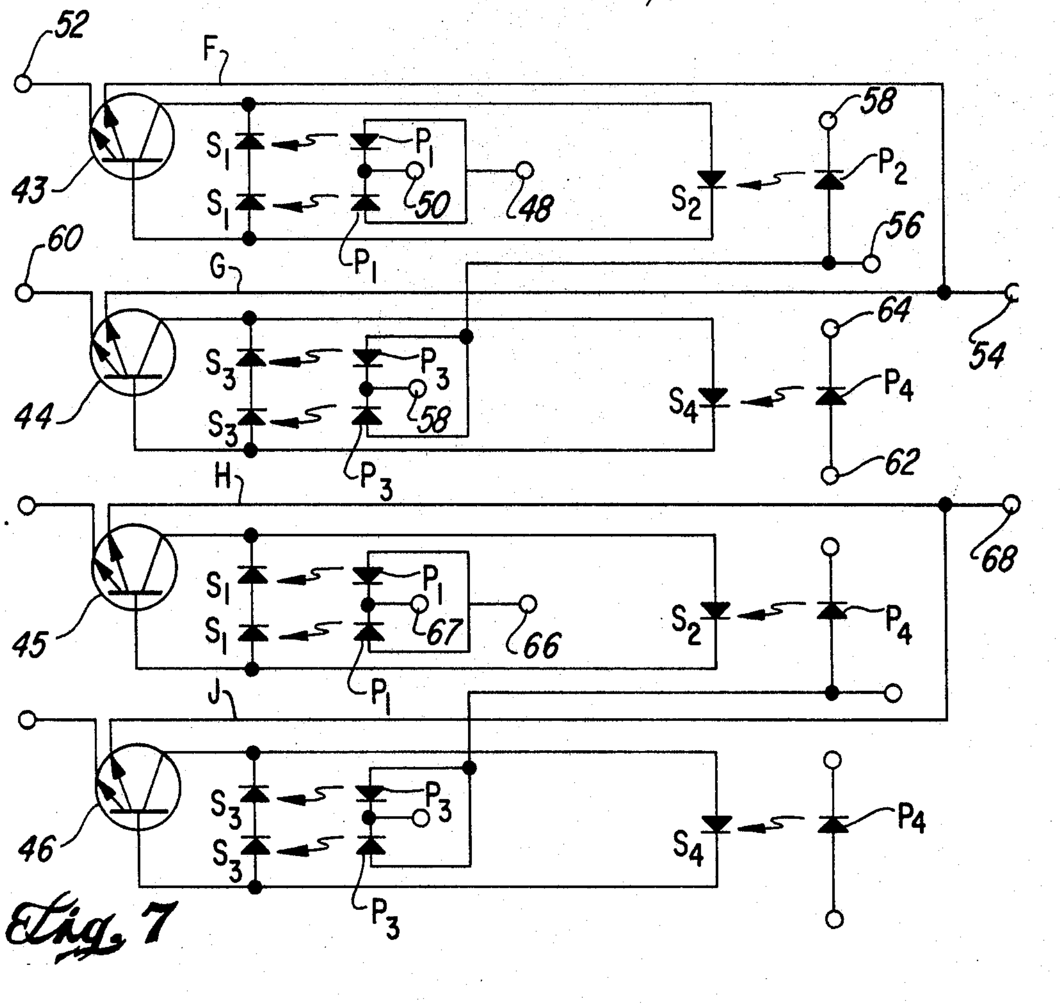
FIGURE 7 is a schematic drawing of a multi-stage array suitable for use as a commutator array.

The single stage illustrated in FIGURE 6 can be incorporated readily into an array. An array containing four commutating switches is illustrated schematically in FIGURE 7. Therein transistors 43, 44, 45 and 46 are employed as switches in, respectively, channels F, G, H and J. The components are connected similarly as described in connection with FIGURE 6. A voltage is applied across contacts 48 and 50, activating photon emitters $P_1$ connected in parallel. This optically turns on semiconductor devices $S_1$, providing a forward bias for the collector-base junction of transistor 43, turning on transistor 43 and switching on channel F between contacts 52 and 54. When the voltage is removed from contacts 48 and 50 and applied across contacts 56 and 58, photon emitters $P_1$ in channel F are deactivated, and photon emitter $P_2$ in channel F, and photon emitters $P_3$ in channel G are activated. Semiconductor devices $S_1$ in channel F are turned off. Photon emitter $P_2$ in channel F optically turns on semiconductor device $S_2$ in channel 1, reverse biasing collector-base junction of and turning off transistor 43. Further, activation of photon emitters $P_3$ optically turns on semiconductor devices $S_3$ in channel G, providing forward bias for the collector-base junction of and turning on transistor 44. This switches on channel G between contacts 54 and 60. When the voltage is removed from contacts 56 and 58, and applied between contacts 62 and 64, photon emitters $P_3$ in channel G are deactivated and photon emitter $P_4$ in channel G is activated, optically turning on semiconductor device $S_4$ in channel G, reverse biasing the collector-base junction of and turning off transistor 44. Contacts 62 and 64 may be connected with contacts 48 and 50. If such is the case, channel F is again switched on. To effect simple commutator switching, channels F and G may be switched alternately onto contact 54 and channels H and J switched, alternately, onto contact 68, by operation as just described.

If desired, contacts 62 and 64 can be connected to contacts 66 and 67 and provide the same stepwise switching on of channel H after channel G that was provided channel G after channel F. Similarly, channel J would thus be switched on after channel H, etc. Any number of channels may be provided. Ordinarily, units of two channels each are manufactured and employed. In any event, in a series set the last two contacts should be connected to the first two contacts, illustrated by contacts 48 and 50, to repeat a cycle of switching. The first two contacts and others which ultimately turn on a transistor may be termed "turn-on" contacts. Conversely, the last two contacts and others which ultimately turn off a transistor may be termed "turn-off" contacts. Contacts 54 and 68 may be termed major contacts since, ordinarily, they afford the path by which the respective channels are connected onto a major circuit (not shown) which advantageously uses the signals afforded by the respective channels. Contact 54 and contact 68 may have a common connection if stepwise switching of the respective channels is desired.

The flexibility afforded by such an array is apparent and the advantages will not be belabored further herein.

Single signal drive

Figure 8:
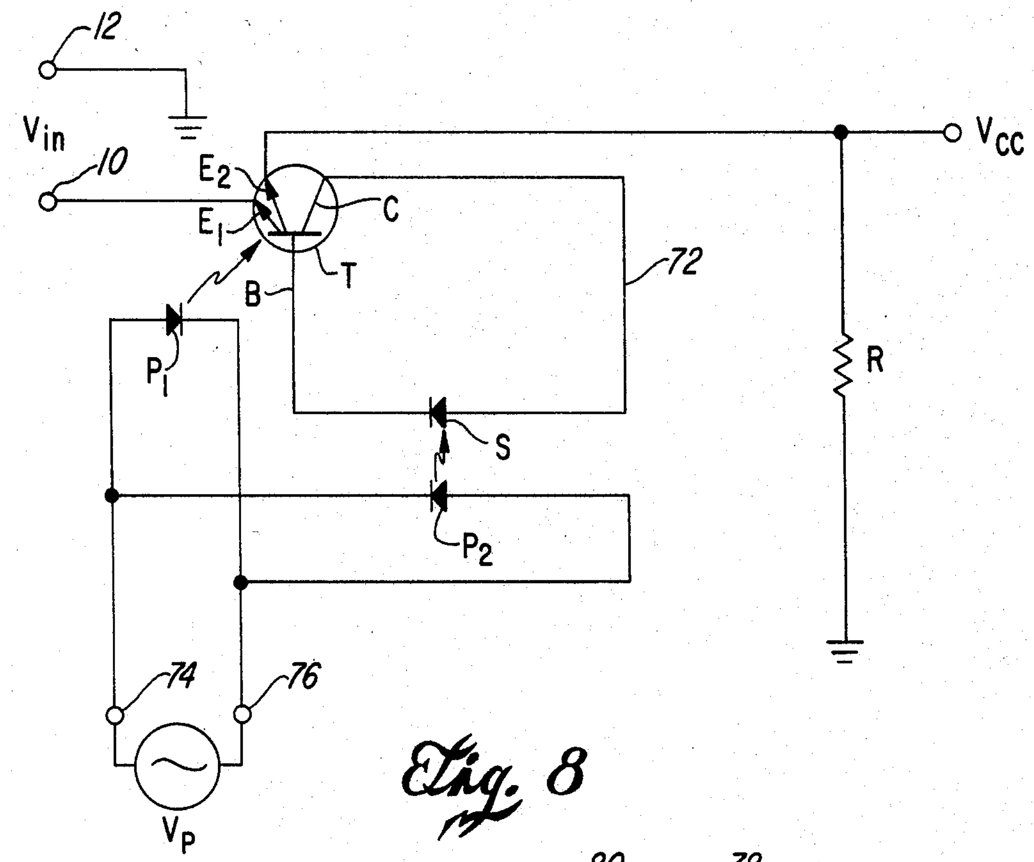
FIGURE 8 is a schematic drawing of an embodiment employing a single sine wave alternating voltage power and control signal.

One embodiment of the invention makes it ideal for driving a transistor switch with a single signal such as a sine wave or square wave voltage. Such an embodiment is illustrated in FIGURE 8. The connection and operation of components in the circuit are essentially the same as previously described with respect to FIGURE 5. In the circuit a load R is coupled in series with transistor T serving as a switch, between contact 10 and ground. A voltage $V_{in}$ is applied across contacts 10 and 12; driving, through the emitter contacts $E_1$ and $E_2$, load R when transistor T is turned on. The collector C of transistor T is connected by circuit 72 through semiconductor device S with the base B of the transistor T. Transistor T is optically turned on by photon emitter $P_1$. Similarly, semiconductor device S is optically turned on by photon emitter $P_2$. To provide alternate operation of photon emitters $P_1$ and $P_2$ a sinewave voltage $V_P$ is impressed across contacts 74 and 76. In response to one-half wave of the sinewave voltage $V_P$, photon emitter $P_1$ is activated, optically turning on transistor T. On the other half of the cycle of voltage $V_P$, photon emitter $P_1$ is deactivated and photon emitter $P_2$ is activated, optically turning on semiconductor device S, which provides a reverse bias across the collector-base junction, all serving to turn off transistor T. In the same manner in the next half cycle of alternating voltage $V_P$, photon emitter $P_2$ is deactivated and photon emitter $P_1$ is activated to initiate a second cycle.

Miscellaneous notes and description of material

For simplicity, the foregoing embodiments have been described with respect to simultaneously turning off photon emitter $P_1$ and turning on photon emitter $P_2$. If intermediate speed switching is desired, photon emitter $P_2$ may be turned on in some tolerably close sequence after photon emitter $P_1$ is turned off. If extremely high speed switching is desired, photon emitter $P_2$ may even be turned on for a time interval immediately prior to turning off photon emitter $P_1$. The electrical engineer will be able to design the circuit to effect the desired speed of switching in accordance with well known engineering principles.

Figure 9:
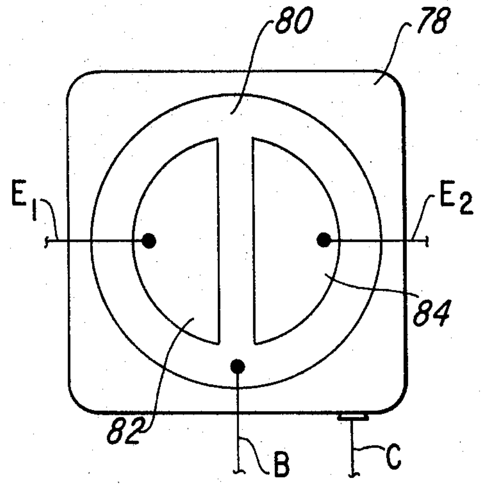
FIGURE 9 is a plan view of a double emitter transistor suitable for use in the invention.

The transistor T may be any of the well known silicon or germanium transistors. Silicon transistors have been found satisfactory. To obtain rapid turn on with less irradiation from photon emitter $P_1$, the structure of the transistor is designed to benefit from all incident light. For example, the base is constructed to be as large as the spot of incident light. Thus, the transistor is also effectively a photodetector. As noted, double emitter transistors may be employed. A double emitter transistor which has been found to be satisfactory is illustrated in FIGURE 9. Therein the collector 78 is provided with an external connection C. Typically the collector 78 is monocrystalline, N-type silicon. Onto the collector 78 a base region 80 is formed and given an external connecting pin B. Onto the base region an emitter region 82 and an emitter region 84 are formed and provided respectively with external connecting pins $E_1$ and $E_2$.

The method of forming a base region and emitter regions onto a collector are well known and will not be described herein.

Semiconductor devices suitable for use as semiconductor device $S$–$S_2$ include silicon solar cells or equivalent. Ordinarily, diodes are employed although a transistor device having the base and emitter connected to form the anode and having the collector forming the cathode has been found satisfactory.

Any light source of sufficient energy can be employed as photon emitters. Solid state devices facilitate miniaturization and are, therefore, preferable. To enable employing an alternating circuit to alternately activate photon emitters $P_1$ and $P_2$, it is preferable to employ, as the photon emitters, solid state devices which also serve as diodes and transmit preferentially in one direction. By observing proper polarity, they can be employed to operate on different half waves of the alternating signal.

By employing method and system of the invention, a transistor can be employed as a switch and effect turn on times of about 1.6 microseconds ($\mu$sec.) and turn off times of about 1.3 microseconds. Thus the invention provides a method and system enabling rapid switching yet still obtaining the ruggedness, reliability and miniaturization potential of solid state components.

Although the invention has been described with a certain degree of particularity, it is to be understood that the present disclosure has been made only by way of example. Numerous changes in the details of construction and the combination and arrangement of components and circuit may be resorted to without departing from the spirit and scope of the invention as hereinafter claimed.

What is claimed is:

1. A method of alternately and rapidly turning on and off a transistor connected in a circuit advantageously employing the rapid switching of said transistor which comprises:

(a) connecting the base of said transistor via a photon responsive semiconductor device in a circuit effecting flow of electrons through said base in a direction opposite to normal flow when said semiconductor device is optically turned on, (b) connecting the base of said transistor via a second photon responsive semiconductor device in a circuit effecting flow of electrons through said base in the same direction as normal flow when said second semiconductor device is optically turned on, (c) optically coupling a photon emitter to said semiconductor device, (d) optically coupling a second photon emitter to said second semiconductor device, (e) activating said second photon emitter to optically turn on said second semiconductor device to initiate flow of electrons in a normal direction through said base, turning on said transistor, (f) deactivating said second photon emitter and activating said photon emitter to optically turn on said semiconductor device to reverse flow of the electrons through said base, discharging said base capacitance and turning off said transistor, (g) deactivating said photon emitter to complete a cycle, and (h) repeating said cycle.

2. The method of claim 1 wherein said photon emitter and said second photon emitter are diodes and are alternately activated by opposite and respective half waves of an alternating voltage signal and said transistor is alternately turned on and off in response to said alternating voltage signal.

3. A method of alternately and rapidly turning on and off a photon excitable transistor connected in a circuit advantageously employing the rapid switching of said transistor which comprises:

(a) optically coupling a photon emitter to said transistor such that emitted photons will impinge upon, excite and turn on said transistor, (b) connecting the collector of said transistor to the base of said transistor with a circuit containing a photon excitable semiconductor device to reverse bias the collector-base junction of said transistor when said semiconductor device is optically turned on, (c) optically coupling a second photon emitter to said semiconductor device such that emitted photons will impinge upon, excite and turn on said semiconductor device, and (d) alternately supplying power to said photon emitter to excite and turn on said transistor and to said second photon emitter to excite and turn on said semiconductor device whereby said collector-base junction of said transistor is reverse biased and said transistor is rapidly turned off.

4. The method of claim 3 wherein said photon emitter and said second photon emitter are diodes and are alternately activated by opposite and respective half waves of an alternating voltage signal and said transistor is alternately turned on and off in response to said alternating voltage signal.

5. A system for rapidly switching a circuit on and off which comprises:

(a) a photon excitable transistor, (b) a circuit connected to said transistor in which the rapid switching action of said transistor is advantageously employed, (c) a first photon emitter adjacent said transistor and positioned such that its emitted photons will impinge upon, excite and turn on said transistor, (d) a semiconductor device, (e) a second circuit connecting said semiconductor device to the base of said transistor and arranged to provide a flow of electrons through said base in a direction opposite to normal flow when said semiconductor device is turned on, (f) a second photon emitter adjacent said semiconductor device and positioned such that its emitted photons will impinge upon, excite and turn on said semiconductor device, and (g) conductors connected to said photon emitter and to said second photon emitter and adapted to supply power to said photon emitter and to said second photon emitter when connected to an effective power source, whereby said transistor is rapidly turned on when said photon emitter is supplied with effective power, and whereby said transistor is rapidly turned off when effective power is removed from photon emitter and is applied to said second photon emitter, exciting and turning on said semiconductor device, in turn effecting a reverse flow of electrons in said base of said transistor.

6. The system of claim 5 wherein said transistor is an NPN type transistor and said second circuit of part (e) is arranged to effect a flow of electrons away from said base of said transistor.

7. The system of claim 6 wherein said second circuit connects said base of said transistor to the cathode of said semiconductor device and connects the anode of said semiconductor device to the collector of said transistor.

8. The system of claim 6 wherein said second circuit connects the base of said transistor to the cathode of said semiconductor device and connects the anode of said semiconductor device to the emitter of said transistor.

9. The system of claim 5 wherein said transistor is a PNP type transistor and said second circuit of part (e) is arranged to provide flow of electrons into said base of said transistor.

10. The system of claim 9 wherein said second circuit connects said base of said transistor to the anode of said semiconductor device and connects the cathode of said semiconductor device to the collector of said transistor.

11. The system of claim 9 wherein said second circuit connects the base of said transistor with the anode of said semiconductor device and connects the cathode of said semiconductor device to the emitter of said transistor.

12. The system of claim 5 wherein said photon emitter and said second photon emitter are also diodes, and are connected in a common circuit but with their respective polarities reversed such that on one-half wave of an alternating power signal said photon emitter is activated and said second photon emitter is deactivated, and on the other half wave of said alternating power signal said photon emitter is deactivated and said second photon emitter is activated.

13. A system for rapidly switching a circuit on and off which comprises:

(a) a transistor and a circuit connected to said transistor and being rendered conductive when said transistor is excited and rendered conductive, (b) a semiconductor device connected in a circuit with said transistor to effect, when said semiconductor dedevice is excited and rendered conductive, flow of electrons in the base of said transistor in a direction opposite to normal flow when said transistor is conductive, (c) a second semiconductor device, connected in a circuit with said transistor to effect, when said second semiconductor device is excited and rendered conductive, flow of electrons in said base of said transistor in a direction which is the same as that in said normal flow, (d) a photon emitter optically coupled to said semiconductor device and connected in a circuit whereby it can become activated upon application of a voltage thereacross, (e) a second photon emitter optically coupled to said second semiconductor device and connected in a circuit whereby it can become activated upon application of a voltage thereacross, whereby said transistor is rapidly turned on when said photon emitter is supplied with power, exciting and rendering conductive said second semiconductor device which causes a normal flow of electrons through the base of said transistor to turn it on, and whereby said transistor is rapidly turned off when power is removed from across said photon emitter and is supplied to second photon emitter, exciting and rendering conductive said semiconductor device which causes a reverse flow of electrons through the base of said transistor to turn it off.

14. The system of claim 13 wherein more than one of said second semiconductor devices are employed in a series connection to induce a greater flow of electrons in the same direction as occurs when said transistor is conductive and more than one of said second photon emitters are optically coupled to said second semiconductor devices.

15. The system of claim 13 wherein said photon emitter and said second photon emitter are also diodes, and are connected in a common circuit but with their respective polarities reversed such that on one-half wave of an alternating power signal said photon emitter is activated and said second photon emitter is deactivated, and on the other half of said alternating power signal said photon emitter is deactivated and said second photon emitter is activated.

16. The system of claim 13 wherein said semiconductor device and said second semiconductor device are connected between the collector and the base of said transistor such that said semiconductor device, upon being excited and rendered conductive, reverse biases the collector-base junction, and said second semiconductor device, upon being excited and rendered conductive, forward biases said collector-base junction.

17. The system of claim 13 wherein said semiconductor device and said second semiconductor device are connected between the emitter and the base of said transistor such that said semiconductor device, upon being excited and rendered conductive, reverse biases the emitter-base junction, and said second semiconductor device, upon being excited and rendered conductive, forward biases said emitter-base junction.

18. The system of claim 16 wherein said transistor is an NPN type transistor and the cathode and anode of said semiconductor device are connected, respectively, to said base and said collector of said transistor; and the cathode and anode of said second semiconductor device are connected respectively to said collector and said base of said transistor.

19. The system of claim 16 wherein said transistor is a PNP type transistor and the cathode and the anode of said semiconductor device are connected, respectively, to said collector and said base of said transistor; and the cathode and the anode of said second semiconductor device are connected respectively to said base and said collector of said transistor.

20. An optoelectronic switching system for rapidly switching, one at a time, at least two channels onto a major circuit employing signals afforded by channels switched thereto, which comprises:

(a) a major contact connected to the major circuit and (b) a first channel, (c) an NPN, double-emitter transistor and a circuit coupling through said transistor's double emitters said first channel to said major circuit through said major contact, (1) two series coupled semiconductor devices having their anodes connected to the base of said transistor and their cathodes connected to the collector of said transistor, (2) two parallel coupled photon emitters optically coupled to said semiconductor devices and connected in a circuit having first and second, turn-on, contacts for imposition of an activating voltage thereacross, (3) a second semiconductor device having its cathode connected to said base of said transistor and its anode connected to said collector of said transistor, (4) a second photon emitter optically coupled to said second semiconductor device and connected in a circuit having third and fourth, turn-off, contacts for imposition of an activating voltage thereacross, (d) another channel, (e) another NPN, double-emitter transistor and circuit coupling through the transistor's double emitters said other channel to said major circuit through said major contacts, (1) another two series coupled semiconductor devices having their anodes connected to the base of said other transistor and their cathodes connected to the collector of said other transistor, (2) another two parallel connected photon emitters optically coupled to said other semiconductor devices and connected in a circuit having fifth and sixth, turn-on, contacts for imposition of an activating voltage thereacross, said fifth and sixth contacts being connected to said third and fourth, turn-off, contacts, (3) another second semiconductor device having its cathode connected to said base of said other transistor and its anode connected to said collector of said other transistor, (4) another second photon emitter optically coupled to said other second semiconductor device and connected in a circuit having seventh and eighth, turn-off, contacts for imposition of an activating voltage thereacross, whereby, upon application of an activating voltage to said first and second, turn-on, contacts, said transistor is turned on and said first channel is switched onto said major circuit; and whereby, upon removal of said activating voltage from said first and second, turn-on, contacts and application of an activating voltage to said third and fourth, turn-off, contacts, said first channel is switched off of said major circuit, said other transistor is turned on, and said other channel is switched onto said major circuit; and whereby, on removal of said activating voltage from said third and fourth, turn-off, contacts, said first channel is in a position to be turned on again, and upon application of an activating voltage to said seventh and eighth, turn-off, contacts, said second channel is switched off of said major circuit.

21. The system of claim 20 in which said seventh and eighth, turn-off, contacts are connected to said first and second, turn-on, contacts such that upon cyclical application of activating voltages said first channel and said second channel are, alternately and respectively, switched onto said major contact and said major circuit.

22. The system of claim 21 wherein said system is connected in parallel with another said system and effects commutator switching.

References Cited

UNITED STATES PATENTS

| | | | |
|---|---|---|---|
| 2,670,445 | 2/1954 | Felker | 307—317 |
| 3,221,631 | 5/1967 | Biard et al. | 250—213 |

OTHER REFERENCES

"Gate" by A. S. Athens, IBM Technical Disclosure Bulletin, vol. 4, No. 5, October 1961.

RALPH G. NILSON, Primary Examiner

M. ABRAMSON, Assistant Examiner

U.S. Cl. X.R.

250—214, 217; 307—268, 311